United States Patent
Lim et al.

(10) Patent No.: US 10,569,617 B2
(45) Date of Patent: Feb. 25, 2020

(54) OUTDOOR UNIT FOR AIR CONDITIONER

(71) Applicant: SAMSUNG ELECTRONICS CO., LTD., Suwon-si, Gyeonggi-do (KR)

(72) Inventors: Chang-soo Lim, Hwaseong-si (KR); Seong-hwan Jang, Suwon-si (KR); Sung-tae Kim, Hwaseong-si (KR); Jong-tae Kim, Hwaseong-si (KR); Jeong-seon Park, Suwon-si (KR); Seung-jin Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 15/630,765

(22) Filed: Jun. 22, 2017

(65) Prior Publication Data

US 2018/0043749 A1    Feb. 15, 2018

(30) Foreign Application Priority Data

Aug. 12, 2016    (KR) .................. 10-2016-0103045

(51) Int. Cl.
*B60H 1/00* (2006.01)

(52) U.S. Cl.
CPC ..... *B60H 1/00521* (2013.01); *B60H 1/00042* (2013.01); *B60H 1/00528* (2013.01); *B60H 1/00557* (2013.01)

(58) Field of Classification Search
CPC ............ B60H 1/00042; B60H 1/00521; B60H 1/00528; B60H 1/00557; F24F 1/22; F24F 1/24
See application file for complete search history.

(56) References Cited

U.S. PATENT DOCUMENTS

| 6,366,461 B1 * | 4/2002 | Pautsch ................. H01L 23/467 165/80.3 |
| 9,228,771 B2 | 1/2016 | Kamitani et al. |
| 2005/0162829 A1 * | 7/2005 | Aker ................. H05K 7/20136 361/695 |
| 2005/0183436 A1 | 8/2005 | Jung et al. |
| 2009/0081940 A1 | 5/2009 | Jang et al. |
| 2009/0133423 A1 | 5/2009 | Jang et al. |
| 2009/0137197 A1 | 5/2009 | Jang et al. |

(Continued)

FOREIGN PATENT DOCUMENTS

| CN | 101441982 | 5/2009 |
| CN | 101576291 | 11/2009 |

(Continued)

OTHER PUBLICATIONS

Extended European Search Report dated Dec. 15, 2017, in corresponding European Patent Application No. 17177518.2, 8 pgs.

(Continued)

*Primary Examiner* — Henry T Crenshaw
(74) *Attorney, Agent, or Firm* — Staas & Halsey LLP

(57) ABSTRACT

An outdoor unit for an air conditioner is provided, which includes a case, a plurality of path portions separated from each other in the case and having a same discharge port, electronic units arranged on the plurality of path portions, and an air circulator arranged on the discharge port of the plurality of path portions to compulsorily circulate air in the case to an outside of the case through the plurality of path portions of the case.

15 Claims, 5 Drawing Sheets

(56) References Cited

U.S. PATENT DOCUMENTS

| | | | | |
|---|---|---|---|---|
| 2012/0162912 A1* | 6/2012 | Kim | ............... | H05K 7/20909 361/692 |
| 2012/0215359 A1* | 8/2012 | Michael | ............... | G06F 1/206 700/275 |
| 2013/0314872 A1* | 11/2013 | Kawakita | ............... | F02B 63/044 361/695 |
| 2014/0326437 A1* | 11/2014 | Kamitani | ............... | F24F 1/22 165/122 |
| 2015/0198339 A1 | 7/2015 | Jeon | | |
| 2016/0148452 A1 | 5/2016 | Torquemada Jiménez | | |

FOREIGN PATENT DOCUMENTS

| | | |
|---|---|---|
| CN | 103827587 | 5/2014 |
| EP | 2 040 008 A2 | 3/2009 |
| EP | 2 762 792 A1 | 8/2014 |
| EP | 2 896 897 A1 | 7/2015 |
| JP | 5-118671 | 5/1993 |
| JP | 5-118672 | 5/1993 |
| JP | 2009-222327 | 10/2009 |
| JP | 2010-175224 | 8/2010 |
| JP | 2010-196926 | 9/2010 |
| JP | 2011-64339 | 3/2011 |
| JP | 5488964 | 5/2014 |
| JP | 5532623 | 6/2014 |
| KR | 2001-0056511 | 7/2001 |
| KR | 10-0954358 | 4/2010 |
| KR | 10-1298404 | 8/2013 |

OTHER PUBLICATIONS

Chinese Office Action dated Jul. 3, 2019 in corresponding Patent Application No. 201710615929.9.
European Office Action dated Dec. 3, 2019 in related European Patent Application No. 17 177 518.2.

* cited by examiner

OUTDOOR UNIT FOR AIR CONDITIONER

CROSS-REFERENCE TO RELATED APPLICATIONS

This application claims priority from Korean Patent Application No. 10-2016-0103045 filed on Aug. 12, 2016 in the Korean Intellectual Property Office, the disclosure of which is incorporated herein by reference in its entirety.

BACKGROUND OF THE INVENTION

Field of the Invention

The present disclosure relates to an outdoor unit for an air conditioner, and more particularly, to an outdoor unit for an air conditioner, which includes a control box that efficiently dissipates heat through forming of a plurality of flow path portions.

Description of the Related Art

In general, an air conditioner is a device which can adjust an indoor temperature and humidity that are suited to human activities using a refrigeration cycle, and remove dust or the like contained in indoor air. As primary constituent elements that constitute the refrigeration cycle, a compressor, a condenser, an evaporator, and an expansion valve are provided.

The air conditioner is classified into an air cooled type air conditioner in which a heat exchanger that functions as a condenser is cooled by air to condense a refrigerant, and a water cooled type air conditioner in which a heat exchanger is cooled by water to condense a refrigerant.

The air cooled type air conditioner has low heat exchange efficiency, and in order to obtain a sufficient cooling effect, the heat exchanger should have a large size. Further, a blower fan for compulsory air flow should be additionally installed.

In contrast, a water cooled type air conditioner that uses a water cooled type heat exchanger has high heat exchange efficiency, and thus the heat exchanger may have a small size. However, a cooling water pipe should be connected to the heat exchanger to continuously supply cooling water, and since it is installed in an airtight space, it may be difficult to dissipate heat.

In particular, if a control box in which a plurality of electronic units are built is installed in an airtight space of an outdoor unit of the water cooled type air conditioner, the electronic units may not show their own functions or the life span thereof may be shortened due to self-heating effects of the control box.

Further, although the electronic units generate heat due to the operation of the air conditioner, such heat of the electronic unit is unable to be properly dissipated to cause a malfunction of the device.

SUMMARY OF THE INVENTION

Exemplary embodiments of the present disclosure provide an outdoor unit for an air conditioner, which includes a control box that has an efficient cooling structure for electronic units. Exemplary embodiments of the present disclosure provide an outdoor unit for an air conditioner provided with an air circulator that effectively dissipates heat through a plurality of path portions through which air flows.

According to an aspect of the present disclosure, an outdoor unit for an air conditioner includes a case; a plurality of path portions separated from each other in the case and having a same discharge port; electronic units arranged on the plurality of path portions; and an air circulator arranged on the discharge port of the plurality of path portions to compulsorily circulate air inside the case to an outside of the case through the plurality of path portions of the case.

According to another aspect of the present disclosure, an outdoor unit for an air conditioner includes a case; a plurality of electronic units installed inside the case; an air circulator including a fan that compulsorily circulates internal air of the case to an outside; at least one intake port provided to make air flow into the case through the fan; a discharge port provided to make the air that has flowed in through the intake port exhausted to the outside of the case; a first path portion through which a part of the air that has flowed into the case through the fan flows; and a second path portion that is separated from the first path portion.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1:
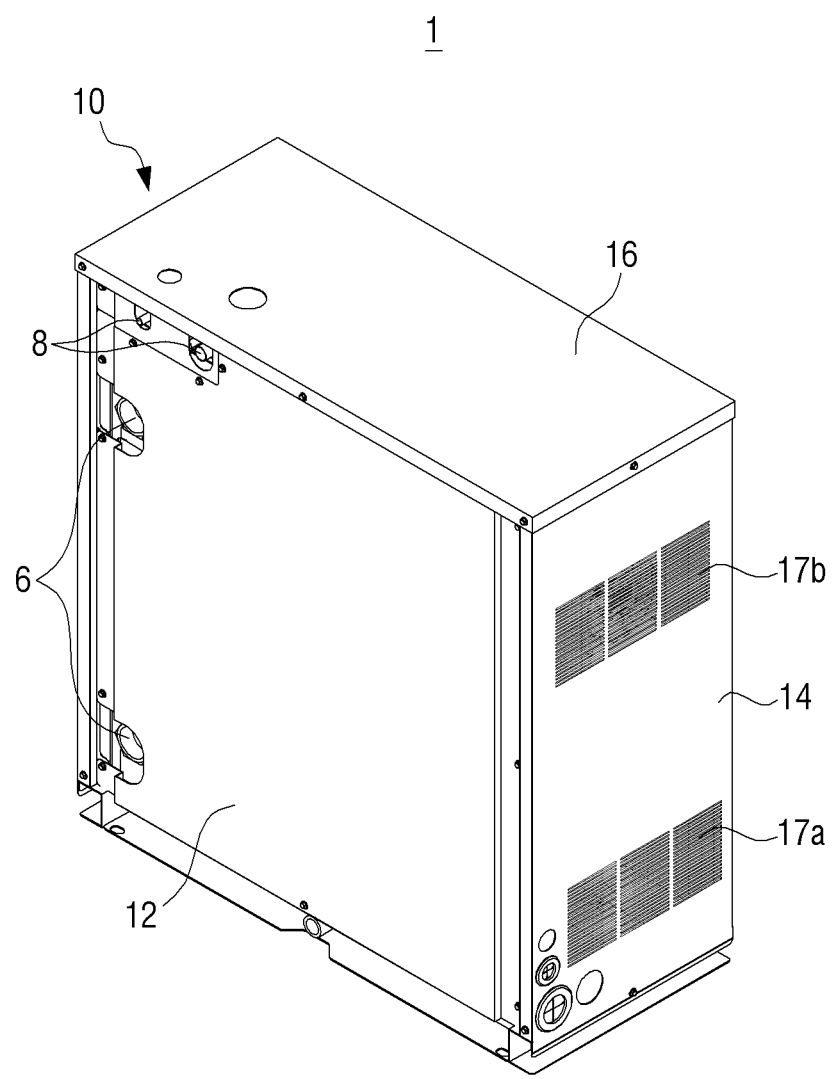
FIGS. 1 and 2 are views illustrating an outdoor unit of an air conditioner according to an embodiment of the present disclosure.

Hereinafter, exemplary embodiments of the present disclosure will be described in detail with reference to accompanying drawings. The following description with reference to the accompanying drawings is provided to assist in a comprehensive understanding of the technical features of the present disclosure. However, the technical features of the present disclosure are not limited by the embodiments, but it is exemplified that the present disclosure may be implemented by the specific embodiments to be described hereinafter.

Accordingly, those of ordinary skill in the art will recognize that various changes and modifications of the embodiments described herein can be made without departing from the scope and spirit of the present disclosure. In addition, in order to help understanding of the embodiments as described hereinafter, like drawing reference numerals are used for the like elements, even in different drawings.

A refrigeration cycle of a water cooled type air conditioner according to the present disclosure is composed of a compressor 2, a condenser 4, an expansion valve, and an evaporator. The refrigeration cycle may circulates a series of processes of compression-condensing-expansion-evaporation, and may supply conditioned air indoors after heat exchanging between the refrigerant and the air.

The compressor 2 compresses a refrigerant gas in high-temperature and high-pressure state to discharge the compressed refrigerant gas, and the discharged refrigerant gas flows into the condenser 4 through a refrigerant pipe 8. The condenser condenses the compressed refrigerant into a liquid state, and discharges heat to the surroundings through the condensing process. The expansion valve expands the high-temperature and high-pressure liquid refrigerant that is condensed by the condenser to a low-pressure liquid refrigerant. The evaporator evaporates the refrigerant that is expanded by the expansion valve. The evaporator achieves the refrigeration effect through heat exchange with a cooled object using latent heat of evaporation of the refrigerant, and returns the low-temperature and low-pressure refrigerant gas to the compressor 2. Through the refrigerant pipe 8 for connecting the above-described devices to form one closed circuit, the air conditioner can condition the air in an indoor space.

An outdoor unit 1 of the air conditioner means a portion that is composed of the compressor 2 and an outdoor heat exchanger of the refrigeration cycle. The expansion valve may be located in any one of an indoor unit and the outdoor unit, and an indoor heat exchanger is located in the indoor unit. The outdoor heat exchanger 10 and the indoor heat exchanger may operate as the condenser or the evaporator for the purpose of the air conditioning.

In the present disclosure, the outdoor heat exchanger 4 corresponds to a water cooled type air conditioner that exchanges heat with water rather than outdoor air. The indoor heat exchanger is provided with a blower fan for compulsorily blowing the indoor air, and exchanges heat with the air to achieve the cooling effect of the indoor air. In the outdoor heat exchanger 4, a cooling water pipe 6 that is connected to a water supply source (not illustrated) is installed to exchange heat with the cooling water.

Accordingly, the high-temperature and high-pressure gas refrigerant that is compressed by the compressor 2 is sent to the outdoor heat exchanger 4 through the refrigerant pipe 8, and exchanges heat with the cooling water that flows along a cooling water pipe 6. The ambient-temperature and high-pressure liquid refrigerant that is heat-exchanged through the outdoor heat exchanger (condenser) 4 passes through the expansion valve to be changed to the low-temperature and low-pressure liquid refrigerant. The low-temperature and low-pressure liquid refrigerant as changed above continuously passes through the interior of the indoor heat exchanger (evaporator). The low-temperature and low-pressure liquid refrigerant is changed to the low-pressure gas refrigerant through absorption of heat from the indoor air that passes through the indoor heat exchanger (evaporator), and then flows to the compressor 2 to be changed again to the high-temperature and high-pressure refrigerant. Through repetition of the above-described process, the air that passes through the indoor heat exchanger (evaporator) can be cooled.

Figure 2:
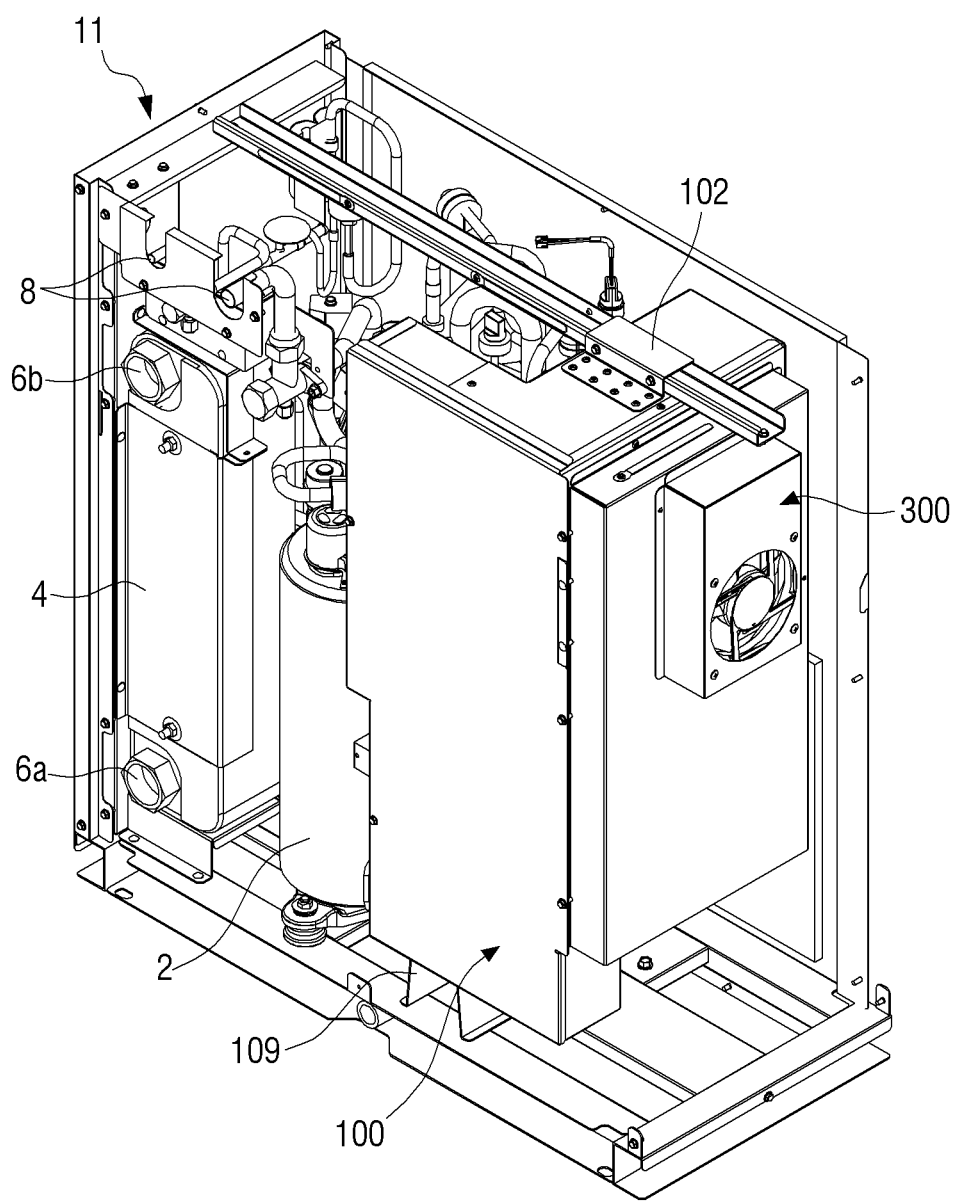

FIGS. 1 and 2 illustrate an outdoor unit of an air conditioner according to an embodiment of the present disclosure. FIG. 1 is a perspective view of the outdoor unit 1 of the air conditioner, and FIG. 2 illustrates the outdoor unit in a state where housings of a front surface 12, a right surface 14, and an upper surface 16 are removed.

Referring to FIGS. 1 and 2, the outdoor heat exchanger 4 according to the present disclosure corresponds to a water cooled type air conditioner that exchanges heat with water rather than outdoor air. The outdoor unit 1 of the air conditioner may include a housing 10 that forms an external appearance, the compressor 2 that compresses and discharges refrigerant gas, the outdoor heat exchanger 4 that condenses the refrigerant gas that is discharged from the compressor 2 to a refrigerant liquid through heat exchange between the refrigerant gas and the cooling water through the cooling water pipe 6, and a control box 100 in which electronic units for controlling the air conditioner are installed.

The housing 10 may have an external appearance that is in the form of a rectangular box that forms an interior space in which the compressor 2, the indoor heat exchanger 4, and the control box 100 can be installed.

The housing 10 may include at least one blowhole 17a and 17b through which outdoor air and indoor air can circulate. A plurality of blowholes 17a and 17b may be formed on the right surface 14 of the housing 10. Through the blowholes 17a and 17b, the outdoor air may flow into the housing 10, and heat that is generated inside the housing 10 may be discharged to the outside.

The outdoor heat exchanger 4 is fixed to one side of the housing 10, and the outdoor heat exchanger 4 is connected to the cooling water pipe 6 and the refrigerant pipe 8. The outdoor heat exchanger 4 is provided with a cooling water inlet portion 6a and a cooling water outlet portion 6b for receiving water that is supplied from an outside to condense the refrigerant. The cooling water pipe 6 that is coupled to the outdoor heat exchanger 4 may be connected toward a front surface 12 of the housing 10, and may be connected to a cooling tower for cooling the cooling water. The refrigerant pipe 8 that is connected to the rear surface of the outdoor heat exchanger 4 may be connected to an indoor unit of the air conditioner after passing through the compressor 2 and an upper portion of a front surface 12 of the housing 10. The refrigerant flows between the outdoor unit and the indoor unit.

The control box 100 includes the electronic units installed therein to control the air conditioner, and an air circulator 300 that circulates indoor air of the control box 100 to cool the electronic units.

The control box 100 may be provided in a state where an upper portion thereof is fixed to one side of the housing 10. A fixing member 102 may be provided on the upper portion of the control box 100, and the fixing member 102 is connected to a frame 11 of the housing 10 to fix the control box 100. In addition, a fixing end 109 may be formed on a lower portion of the control box 100 to fix the control box 100 to the outdoor unit 1 more stably.

Figure 3:
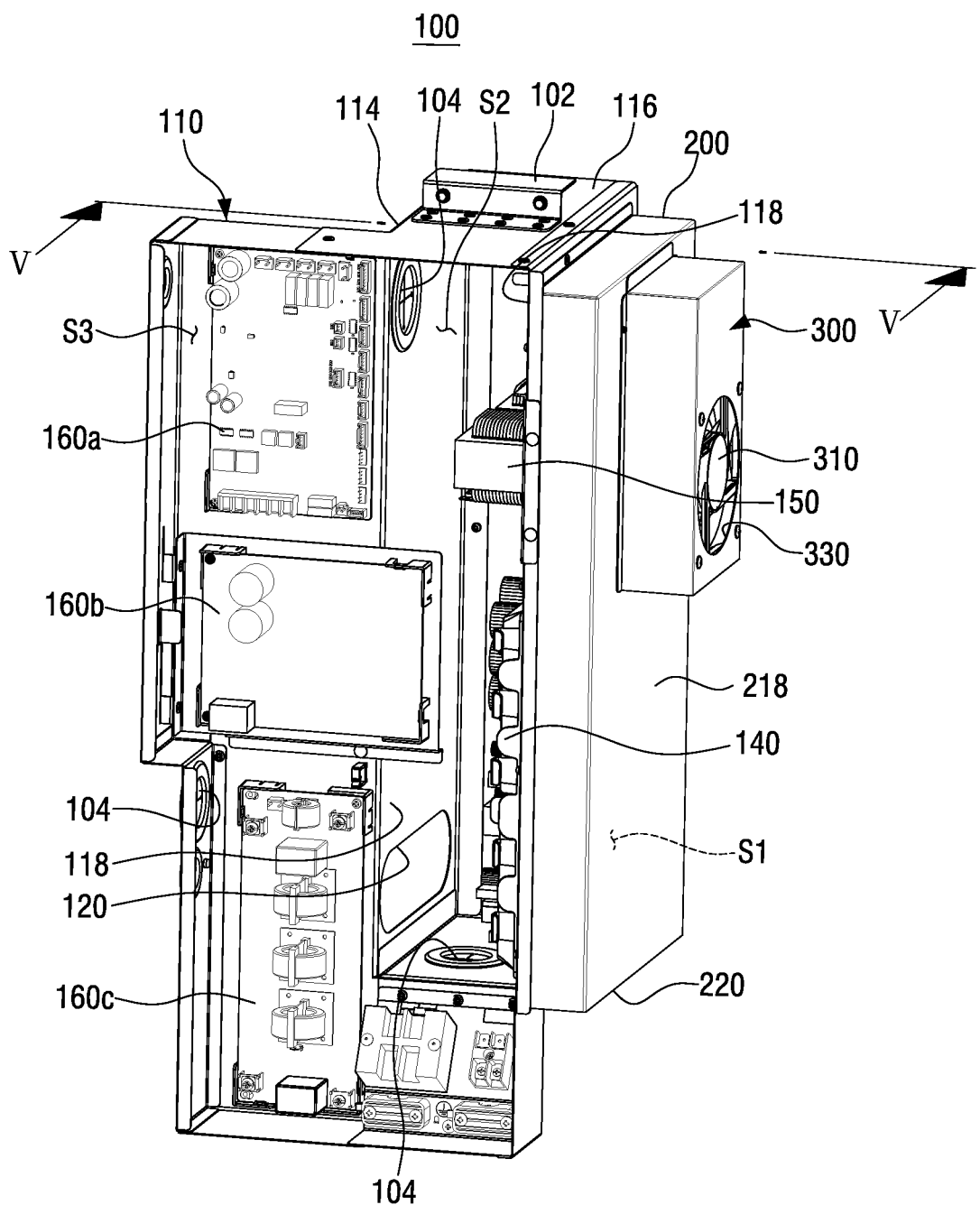
FIGS. 3 and 4 are views illustrating a control box according to an embodiment of the present disclosure.
Figure 4:
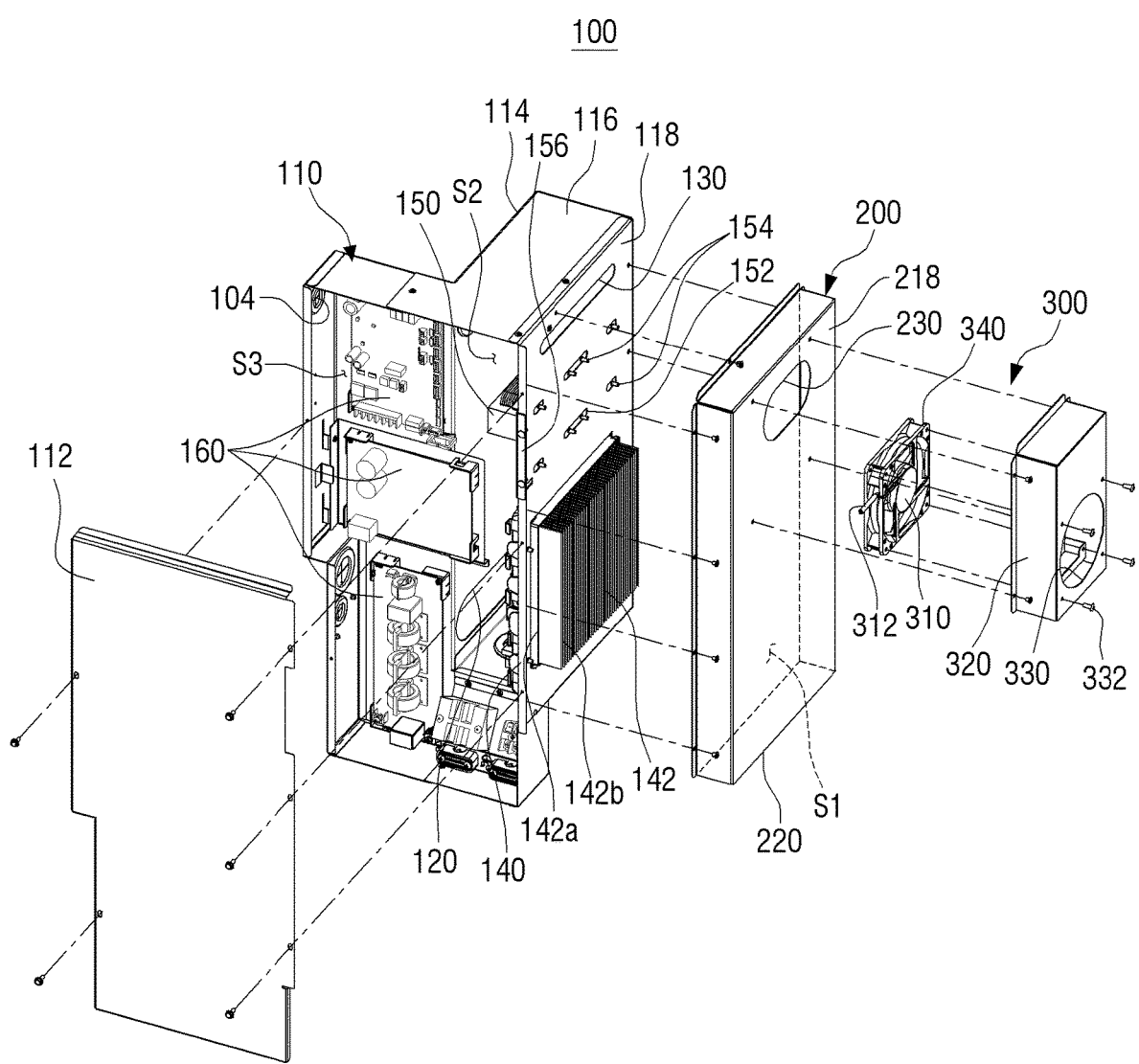

FIGS. 3 and 4 illustrate a control box according to an embodiment of the present disclosure. FIG. 3 is a view illustrating a control box 100 in a state a front case 112 thereof is removed, and FIG. 4 is an exploded perspective view of the control box 100.

A control box case that forms an external appearance of the control box 100 may have a space for a first path portion S1, a second path portion S2, and a third path portion S3. Accordingly, the control box case includes a duct 200 that forms the first path portion S1, and a case 110 that forms the second and third path portions S2 and S3. Hereinafter, for convenience in explanation of the present disclosure, it is described that a portion that forms the second and third path portions S2 and S3 that are parts of the case of the control box 100 is the case 110 in order to discriminate between the case 110 and the duct 200.

Referring to FIG. 3, the control box 100 includes the case 110, electronic units 140, 150, and 160a, 160b, and 160c (herein after 160) located inside the case 110, the duct 200 arranged on one side of the case 110 to form a space through which air flows, and an air circulator 300 arranged on one side of the case 110 and including a fan 310 for compulsorily circulating indoor air of the case 110.

In the control box 100, the duct 200 and the air circulator 300 may be arranged in lamination (successively arranged)

in a side surface direction on an outside of the case 110. That is, the duct 200 is coupled to the right surface 118 of the case 110, and the air circulator 300 is coupled to the right surface 218 of the duct 200 to form air flow spaces inside the case 110 and inside the duct 200. The air flow spaces are provided by the first path portion S1 that is formed through coupling of the duct 200 and the case 110 and the second path portion S2 that is formed inside the case 110.

One end of the duct 200 is coupled to the case 110 to form the first path portion S1. A lower end of the duct 200 is formed in an open type to form a first intake port 220 through which external fresh air flows in. The other end of the duct 200 may be coupled to the air circulator 300, and a first discharge port 230 (see FIG. 4) that communicates with the air circulator 300 may be formed at the other end 218. Air flows from the first intake port 220 to the first discharge port 230 through the first path portion S1 that is formed inside the duct 200, and in this case, a heat sink 142 (see FIG. 4) for heat dissipation of a first component 140 that is a main heat generation body to be described later among the electronic units may be arranged on the first path portion S1. The first discharge port 230 may be located on the downstream side of the first component 140 on a flow path portion of the air that flows along the first path portion S1. Here, the downstream side means a lower side of the air flow.

The air that flows through the first path portion S1 may directly cool the first component 140, and in the duct 200, the first path portion S1 for cooling the first component 140 that is the main heat generation body is formed separately from the second and third path portions S2 and S3, so that internal heat dissipation of the control box 100 becomes more effective.

The case 110 is a part of the control box case that forms the external appearance of the control box 100, and forms the space for accommodating the electronic units. Further, the case 110 may include at least one second intake port 120 and at least one second discharge port 130 (see FIG. 4) that communicate with the outside of the control box 100 to circulate the indoor air of the case 110 through the air circulator 300.

The at least one second intake port 120 is located on the lower portion of the case 110, and the at least one second discharge port 130 is located on the upper portion of the case 110, so that the air that flows into the lower portion of the case 110 may be exhausted to the upper portion after passing through the interior of the case 110. The second intake port 120 through which the external air flows in may be formed on one surface 114 of the case, and the second discharge port 130 for discharging the air inside the case 110 may be formed on the other surface 118 that faces the one surface 114. As seen in FIG. 3, the one surface 114 is the left surface of the second path portion S2, and the other surface 118 may be the right surface 118 of the second path portion. The duct 200 may be arranged on the other surface 118, and the second discharge port 130 may communicate with the duct 200 to discharge the air inside the case 110 to the duct 200. The air inside the case 110 may be discharged to the outside after passing through the duct 200 by the air circulator 300.

In the case 110, the second path portion S2 having a flow path portion through which the air flows from the second intake port 120 to the second discharge port 130 may be formed, and a third path portion S3 for accommodating the electronic units 160 may be formed. In this case, the first component 140 and the second component 150 to be described later may be arranged on the second path portion S2. The second discharge port 130 may be located on the downstream of the second component 150 on a flow path portion of the air that flows along the second path portion S2. Accordingly, the air that flows through the second path portion S2 directly cools the second component 150. Although heat of the first component 140 is transferred to the heat sink 142 that is located on the first path portion S1, the first component 140 may also be additionally cooled by the air that flows through the second path portion S2.

The air that flows into the second path portion S2 through the second intake port 120 is discharged to the first path portion S1 through the second discharge port 130, and then is discharged to a main discharge port 330 through the first discharge port 230 together with the air that flows into the first path portion S1. The second path portion S2 and the first path portion S1 sharing one main discharge port for discharging air to the outside of the case.

The case 110 may be formed long in the length direction so as to be efficiently located in the space inside the outdoor unit 1. Further, the case 110 may be formed to be bent on one side and to have "⌐" shape as seen from an upper side in order to accommodate a plurality of electronic units 160. The case 110 may be partitioned as the second path portion S2 that is formed by one side 114 and the other side 118 that respectively include the second intake port 120 and the second discharge port 130, and the third path portion S3 that is formed through bending to the one side. For efficient space usage of the control box 100, the plurality of electronic units 160 may be arranged on the third path portion S3, and the electronic units 160 that are located on the third path portion S3 may be components having a heat generation rate that is lower than the heat generation rate of the components that are located on the first and second path portions S1 and S2. In the drawing, it is illustrated that one side of the case 110 is bent, but is not limited thereto. The case may be diversely formed to have at least one air flow space.

On an upper surface 116 of the case 110, a fixing member 102 may be coupled to be fixed to the housing 10. On one side of the case 110, an opening 104, through which wires for connecting the electronic units 160 that are located inside the case to external devices pass, may be provided.

In proportion to the development of the electronic units 140, 150, and 160, power consumption is increased, and thus the heat generation rate of the electronic units 140, 150, and 160 having high power consumption may become very high. If the heat that is generated from the electronic units 140, 150, and 160 is not properly treated, operation failure or malfunction may occur. Further, due to temperature increase of the electronic units 140, 150, and 160, the lifespan may be shortened, and the performance may be deteriorated. Accordingly, in order to secure the product reliability, the structure of the duct 200 for cooling the electronic units and the air circulator 300 are needed.

The electronic units 140, 150, and 160 that generate heat may be arranged on one inner side wall of the case 110. Among the electronic units 140, 150, and 160, the first component 140 that is the main heat generation body may be arranged on the first path portion S1. The first path portion S1 is a space in which the duct 200 and the case 110 are coupled to each other to cool the first component 140. The first component that is the main heat generation body may be an inverter controller, and the inverter controller, which controls the compressor 2 to perform high-speed operation or low-speed operation in accordance with an indoor condition of the air conditioner or a user's operation, may have the highest heat generation rate among the electronic units.

The second component 150 may be arranged on the second path portion S2. The second component 150 has the heat generation rate that is lower than that of the first component 140, but corresponds to a main heat generation body. The second component may be a reactor.

The first and second components 140 and 150 that are main heat generation bodies may be located on the upper portion of the case 110, and the air circulator 300 may be located on one side of the upper portion of the case for heat dissipation of the electronic units. The remaining electronic units 160 may be arranged on the third path portion S2. The electronic units 160 arranged on the third path portion S2 may be EMI and the like. For efficient cooling, the first and second components 140 and 150 that are main heat generation bodies may be concentrated on the other side 118 of the case 110, and the air circulator 300 may be arranged together on the other side 118 of the case 110.

The air circulator 300 may be coupled to one side 218 of the duct 200, and may be located adjacent to the first discharge port 230 that is formed on the duct 200. The air circulator 300 may circulate the indoor air of the control box 100 using a fan 310. In an embodiment of the present disclosure, since the outdoor unit 1 can discharge the heat inside the control box 100 using the fan 310 only, the electronic units 140, 150, and 160 can be efficiently cooled.

Unlike the related art that uses a refrigerant cooling device together, the outdoor unit of the air conditioner according to an embodiment of the present disclosure can dissipate heat in the control box 100 and can circulate the indoor air of the control box 100 through the structure of the duct 200 and the plurality of flow paths that are formed in the case 110 for optimized air circulation using only the air circulator 300. According to the above-described structure according to the present disclosure, since the outdoor unit 1 of the air conditioner does not require components for cooling the refrigerant, the material cost can be saved, and the size of the outdoor unit 1 can be reduced to achieve a compact outdoor unit design. Further, since the pipe 8 through which the refrigerant flows and the control box 100 are separated from each other, services can be easily provided when the outdoor unit 1 gets out of order.

Referring to FIG. 4, a plurality of path portions for cooling the electronic units may be formed inside the control box 100. Specifically, the first path portion S1 may be formed through coupling of the duct 200 to the outside of the case 110, and the second path portion S2 may be formed on the inside of the case 110 by the structure of the case 110.

The first path portion S1 is a path through which air flows from the first intake port 220 that is formed on the duct 200 to the first discharge port 230. In order to dissipate heat of the first component 140 that has the highest heat generation rate, the first path portion S1 is formed through coupling of the duct 200 to the outside of the case 110. In accordance with the structure of the duct 200, a space for heat dissipation of the first component 140 that is the main heat generation body is separately formed to achieve effective heat dissipation. Since the heat that is generated from the first component 140 is treated through the structure of the duct 200, the product reliability can be secured.

The second path portion S2 is a path through which air flows from the second intake port 120 that is formed on the case 110 to the second discharge port 130. The second intake port 120 may be formed on a lower portion of one side surface 114 of the case, and the second discharge port 130 may be formed on an upper portion of the other side surface 118 that is opposite to the one side surface 114. The amount of air that flows into the second intake port 120 may be adjusted in accordance with the size of the second intake port 120 and a gap between one side 114 and the other side 118 of the case at a point where the second intake port 120 is located. The area of the second intake port 120 may be larger than the area of the second discharge port 130.

The second path portion S2 may perform not only heat dissipation of the second component 150 that is arranged on the second path portion S2 but also dissipation of the heat that is generated by the electronic units 160 that are arranged on the third path portion S3 to the outside. In the case 110, the second component 150 can be directly cooled by the air that flows through the second path portion S2. The heat that is generated from the electronic units 160 may flow into the second path portion S2 through the air circulator 300 to dissipate heat of the third path portion S3, and thus the electronic units 160 that are arranged on the third path portion S3 can be indirectly cooled.

The air circulator 300 that compulsorily circulates the air through the first and second path portions S1 and S2 may be arranged on one side surface of the duct 200. For effective heat dissipation of the electronic units, the first component 140 may be arranged most adjacent to the air circulator 300.

For effective heat dissipation, the first component 140 may be coupled to the heat sink 142 that comes in direct contact with the first component 140 to penetrate the case 110. The first component 140 may be coupled to the heat sink 142 and may be fixed to the one side 118 of the case 110. The heat sink 142 may include a first portion 142a that is arranged to come in direct contact with the first component 140 to absorb heat from the first component 140, and a second portion 142b that is arranged on the first path portion S1 to dissipate heat to the outside of the case 110.

Since the temperature of the first component 140 is higher than the temperature of the air that flows from the first intake port 220 to the first path portion S1, heat exchange may be performed between the first component 140 and the air that flows through the first path portion S1.

Since no heat-resistant mechanical structure exists between the first component 140 and the first portion 142a of the heat sink 142, the heat can be directly dissipated to heighten the heat transfer efficiency. The first portion 142a and the second portion 142b of the heat sink 142 may be composed of one member without any fastening device.

The heat sink 142 is in the form of a wide flat plate, and the heat transfer efficiency can be heightened using its wide surface area. The area of the first portion 142a may be set to be smaller than the area of the second portion 142b, and the heat sink 142 may come in contact with the first component 140 on the first path portion S1 that is the outside of the case 110. Through this structure, the duct 200 and the air circulator 300 can be easily installed even after the electronic units are all installed in the control box 100.

For effective heat dissipation, the second component 150 may be located on one side 118 of the case 110 to be adjacent to the second discharge port 130. A plurality of fixing holes 152 for fixing the second component 150 may be formed on one side 118 of the case. The second component 150 may be coupled to the case 110 through a separate fastening plate 156. The second component 150 may be fixed using the fixing holes 152 of the case 110 and screws 154.

Since the temperature of the second component 150 is higher than the temperature of the air that flows from the second intake port 120 to the second path portion S2, heat exchange may be performed between the second component 150 and the air that flows through the second path portion S2.

Since no heat-resistant mechanical structure exists between the second component 150 and one side 118 of the case 110 to which the second component 150 is fixed, the heat can be directly dissipated to heighten the heat transfer efficiency. The thermal conductivity of the second component 150 and the case 110 is high, and the second component 150 may be indirectly cooled by the air that flows through the first path portion S1 through the structure that is screw-coupled to the plurality of fixing holes 152 that are formed on the case 110 through the separate fastening plate 156. The first portion 142a and the second portion 142b of the heat sink 142 may be composed of one member without any fastening device. In accordance with such a fixing structure of the second component 150, the second component 150 can be efficiently cooled.

The air circulator 300 is to circulate the air in the control box 100 using the fan 310, and may be located on the outside of the duct 200 to be adjacent to the first discharge port 230. The fan 310 may be installed in front of the first discharge port 230 that is located on an outer side surface 218 using covers 320 and 340.

The fan 310 may be mounted on a fan cover 340 in a state where its rotation center is rotatable. The fan cover 340 may include a motor connection portion 312 that can connect the fan 302 and a motor (not illustrated) to each other. The fan cover 340 may be mounted on the front cover 320. In front of the front cover 320, a screw 332 is mounted to be coupled to the case 110 to penetrate the fan cover 340. The main discharge port 330 may be formed on the front cover 320. The air inside the control box 100 may be discharged to the outside through the main discharge port 330 by means of the fan 310.

According to the present disclosure, since heat dissipation of the control box 200 becomes possible through only the fan 310 of the air circulator 300, the control box 100 can be efficiently cooled, the size of the outdoor unit 1 can be reduced, and the material cost can be saved.

The first component 140 having the highest heat generation rate may be arranged on the first path portion S1 in the duct 200 to be adjacent to the air circulator 300, and the second component 150 having high heat generation rate that is next to the first component 140 may be arranged on the second path portion S2 in the case 110.

For effective cooling of the electronic units, the first and second components 140 and 150 may be located adjacent to the first and second discharge ports 230 and 130.

Figure 5:
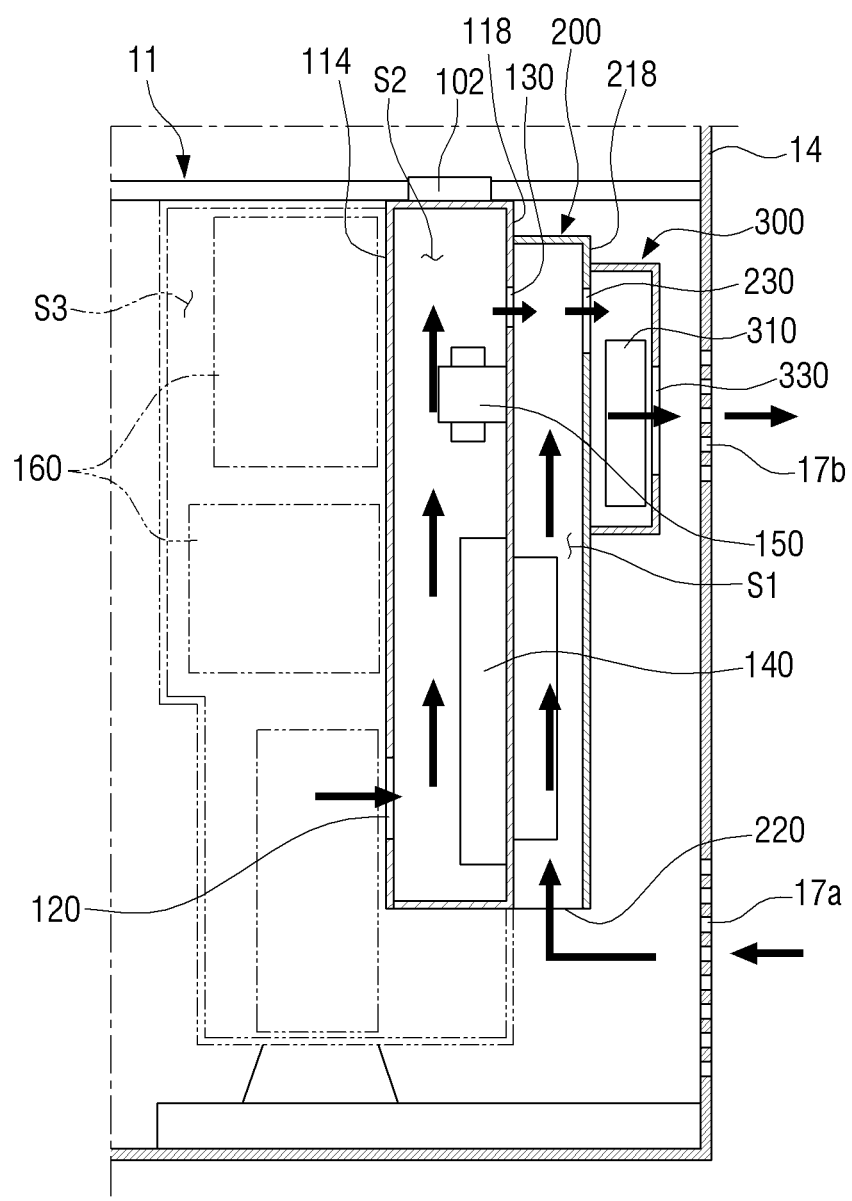
FIG. 5 is a cross-sectional view taken along line V-V of FIG. 3, illustrating an air flow in an outdoor unit of an air conditioner.

FIG. 5 is a cross-sectional view taken along line V-V of FIG. 3, illustrating an air flow in an outdoor unit of an air conditioner. In FIG. 5, an intake port and a discharge port are schematically illustrated to clearly indicate an air flow, and a third path portion S3 that is formed on a front surface against line V-V indicated in FIG. 3 is illustrated by a phantom line. Air that flows from a second intake port 120 is an external air that flows from an outside of a case 110.

Referring to FIG. 5, on an outside of the case 110, a first path portion S1, through which external air that is compulsorily sucked is transported and which communicates with an air circulator 300, and a second path portion S2, which is separated from the first path portion S1, through which the external air that is compulsorily sucked is transported, and which communicates with a duct 200, are arranged.

By a fan 310 of the air circulator 300, a part of the external air may flow into the first path portion S1 through the first intake port 220, and a part of the remainder may flow into the second path portion S2 through a second intake port 120 to flow into a control box 100. The air that flows into the control box 100 exchanges heat with electronic units as passing through the first path portion S1 or the second path portion S2 for cooling of the electronic units, is discharged to the air circulator 300 through discharge ports 130 and 230, and then is discharged to an outside through a main discharge port 330.

On the duct 200 that forms the first path portion S1, the first intake port 220 that intakes external air and the first discharge port 230 that communicates with the air circulator 300 are formed, and a first component 140 is arranged in the first path portion S1. The air that flows from the outside flows through the first path portion S1. One end of the first path portion S1 communicates with the first intake port 220 to intake the external air, and the other end of the first path portion S1 communicates with the first discharge port 230 to cause the air that flows through the first path portion S1 to be discharged to the outside through the first discharge port 230 and the air circulator 300. The air that is discharged to the first discharge port 230 may be mixed with the air of the second path portion S2 to flow.

The first component 140 may be arranged in the first path portion S1, and specifically, a heat sink 142 that absorbs heat from the first component 140 may be arranged in the first path portion S1. The air that flows through the first path portion S1 necessarily flows through the heat sink 142 of the first component 140. Since the temperature of the air that flows through the first path portion S1 is lower than the temperature of the first component 140, heat exchange is performed between the first component 140 and the air that flows through the first path portion S1 to cool the first component 140.

The first path portion S1 is a flow path for dissipating heat of the first component 140 that is a main heat generation body, and is formed as a separate space on the outside of the case 110 using the structure of the duct 200 to perform efficient heat dissipation in the control box 100.

On the case 110 that forms the second path portion S2, the second intake port 120 that intakes external air and the second discharge port 130 that communicates with the duct 200 are formed, and a second component 150 is arranged in the second path portion S2. The air that flows from the outside flows through the second path portion S2. One end of the second path portion S2 communicates with the second intake port 120 to intake the external air, and the other end of the second path portion S2 communicates with the second discharge port 130 to cause the air that flows through the second path portion S2 to be discharged to the outside through the second discharge port 130, the first path portion S1, and the air circulator 300. The air that flows through the second path portion S2 may be discharged to the first discharge port 230, and may be mixed with the air that flows through the first path portion S1 to flow toward the main discharge port 330.

The second component 150 may be arranged in the second path portion S2. The air that flows through the second path portion S2 necessarily flows through the second component 150. Since the temperature of the air that flows through the second path portion S2 is lower than the temperature of the second component 150, heat exchange is performed between the second component 150 and the air that flows through the second path portion S2 to cool the second component 150.

The second path portion S2 is a flow path for cooling the interior of the case 110, and not only cools the second component 150 but also discharges the heat in the case 110 to the outside. The second component 150 may be directly cooled by the air that flows through the second path portion S2, the air of the third path portion S3 is also circulated as the heat that is generated from the remaining electronic units 160 is sucked by the fan 310, and thus the electronic units 160 that are arranged on the third path portion S3 can also be cooled.

As described above, the first and second components 140 and 150 that are main heat generation bodies may be located on the first and second path portions S1 and S2, and the air circulator 300 may compulsorily circulate the external air through the first and second path portions S1 and S2 to achieve efficient heat dissipation.

According to the present disclosure, the duct 200 that is an optimized flow path for cooling of the control box 100 includes the first path portion S1 for cooling the first component 140 having the highest heat generation rate among the electronic units and the second path portion S2 for cooling the interior of the case 110, and thus the control box 100 can be efficiently cooled.

The heat that is generated from the interior of the control box 100 can be efficiently discharged through the structure in which the first and second intake ports 220 and 120 are located on the lower portion of the control box 100, and the first and second discharge ports 230 and 130 are located on the upper portion of the control box 100. Since hot air is light and tends to rise, the hot air can be directly exhausted to the outside without circulating the interior of the control box 100 through circulation of the air from the lower portion to the upper portion.

Accordingly, two intake ports 120 and 220 are provided on the lower portion of the control box 100, and the main discharge port 330 is provided on the upper portion of the control box 100. The main discharge port 330 is connected to the air circulator 300, and the air is exhausted to the outside of the control box 100 by the operation of the fan 310. To match the locations of the first intake port 220 and the main discharge port 330, the housing may also include a blowhole 17a that is provided on one side of the lower portion thereof and a blowhole 17b that is provided on one side of the upper portion thereof. Through the blowholes 17a and 17b, the air that circulates in the housing 10 may circulate in the control box 100 through at least one of the intake ports 120 and 220 and the main discharge port 330.

Although it is described that the case 110 and the duct 200 are separated from each other, the whole control box case that forms the external appearance of the control box 100 includes the case 110 and the duct 200.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An outdoor unit for an air conditioner comprising:
   a case;
   a plurality of paths formed in the case, the plurality of paths including a first path and a second path which is formed adjacent to the first path so that the first path and the second path is divided by a shared surface;
   a first electronic component arranged in the shared surface so that a first part of the first electronic component is exposed in the first path and heat from the first part is dissipated by air flows through the first path and a second part of the first electronic component is exposed in the second path and heat from the second part is dissipated by the air flows through the second path; and
   an air circulator arranged on a first discharge port of the first path to compulsorily circulate the air in the case to an outside of the case through the plurality of paths of the case.

2. The outdoor unit as claimed in claim 1, wherein the plurality of paths have intake ports formed in different locations.

3. The outdoor unit as claimed in claim 2, wherein one of the intake ports is formed at a lower part of the case, the first discharge port is formed at an upper part of the case, and the air circulator discharges air that flows into the lower part of the case to the upper part of the case through.

4. The outdoor unit as claimed in claim 1, wherein the case comprises a first duct which forms the first path and the air flowing through the first duct is discharged through the first discharge port and a second duct which forms the second path and the second path has a second discharge port which the air flowing through the second path is discharged therethrough.

5. The outdoor unit as claimed in claim 4, wherein the first path is arranged more adjacent to the air circulator than the second path.

6. The outdoor unit as claimed in claim 4, further comprising a second electronic component that is arranged in the second path, and the first electronic component is a heat generation body having a heat generation rate that is higher than the heat generation rate of the second component.

7. The outdoor unit as claimed in claim 6, wherein the first discharge port of the first path is formed on a downstream side of an air flow path of the first path so that the air flowing through the first path cools the first electronic component when passing by the first electronic component and is discharged through the first discharge port of the first path.

8. The outdoor unit as claimed in claim 6, wherein the second discharge port of the second path is formed on a downstream side of an air flow path of the second path so that the air flows through the first path cools the second component when passing by the second component and is discharged through the second discharge port of the second path.

9. The outdoor unit as claimed in claim 1, wherein the air circulator comprises a fan to force the air in the case to be discharged to the outside of the case.

10. An outdoor unit for an air conditioner comprising:
    a case;
    a plurality of electronic components installed inside the case, the plurality of electronic components including a first electronic component;
    an air circulator including a fan that forces internal air of the case to discharge to an outside of the case;
    at least one intake port to introduce outside air into the case by the fan;
    a discharge port where the air introduced through the intake port to be discharged to the outside of the case;
    a first path formed in the case through which the air introduced into the case by the fan flows; and
    a second path formed in the case and is adjacent to the first path so that the first path and the second path are divided by a shared surface,
    wherein the first electronic component is installed in the shared surface so that a first part of the first electronic component is exposed in the first path and heat from the first part is dissipated by the air flows through the first path, and a second part of the first electronic component is exposed in the second path and heat from the second part is dissipated by the air flows through the second path.

11. The outdoor unit as claimed in claim 10, further comprising a duct which forms the first path, wherein the duct is configured to accommodate the first part of the first electronic component, and the duct has the intake port to introduce the air to cool the first part of the electronic components and the discharge port to discharge the air flowing inside the duct to the outside of the case.

12. The outdoor unit as claimed in claim 11, wherein the first path is arranged more adjacent to the air circulator than the second path.

13. The outdoor unit as claimed in claim 12, wherein the plurality of electronic components further comprises a second electronic component that is arranged on the second path.

14. The outdoor unit as claimed in claim 13, wherein the first electronic component is a heat generation body having a heat generation rate that is higher than the heat generation rate of the second component.

15. The outdoor unit as claimed in claim 10, wherein the intake port is located on a lower part of the case and the discharge port is located on an upper part the case so that air that flows introduced to the intake port by the fan moves from the lower part to the upper portion thereby passing through the plurality of electronic components to cool the plurality of the electronic components.

* * * * *